US012649369B2

(12) United States Patent
Namuduri et al.

(10) Patent No.: US 12,649,369 B2
(45) Date of Patent: Jun. 9, 2026

(54) LOW LOSS ACTIVE HIGH VOLTAGE POWER SWITCH

(71) Applicant: GM GLOBAL TECHNOLOGY OPERATIONS LLC, Detroit, MI (US)

(72) Inventors: Chandra S. Namuduri, Troy, MI (US); Benjamin S. Ngu, Rochester Hills, MI (US); Khorshed Mohammed Alam, Canton, MI (US); Rashmi Prasad, Troy, MI (US); Yilun Luo, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/940,932

(22) Filed: Nov. 8, 2024

(65) Prior Publication Data

US 2026/0131664 A1    May 14, 2026

(51) Int. Cl.
| | |
|---|---|
| *B60L 50/60* | (2019.01) |
| *B60L 3/00* | (2019.01) |
| *B60L 15/00* | (2006.01) |
| *B60L 15/20* | (2006.01) |
| *H02J 7/00* | (2026.01) |
| *H02P 27/00* | (2006.01) |

(52) U.S. Cl.
CPC ............. *B60L 15/007* (2013.01); *B60L 50/60* (2019.02); *H02P 27/00* (2013.01); *B60L 2210/44* (2013.01)

(58) Field of Classification Search
CPC .... B60L 15/007; B60L 50/60; B60L 2210/44; H02P 27/00
See application file for complete search history.

(56) References Cited

U.S. PATENT DOCUMENTS

2016/0211772 A1*    7/2016   Degner .................. H02M 1/38

FOREIGN PATENT DOCUMENTS

| | | | | |
|---|---|---|---|---|
| DE | 102017123644 A1 | 4/2018 | | |
| EP | 4156501 A1 * | 3/2023 | .............. | H02P 27/08 |

OTHER PUBLICATIONS

Diodes Incorporated. (Jul. 2022). AP74700Q Automotive-Compliant Ideal Diode Controller. Datasheet. <https://www.mouser.com/datasheet/2/115/AP74700Q-3084900.pdf>. Texas Instruments LM74700-Q1.

(Continued)

*Primary Examiner* — Elim Ortiz

(74) *Attorney, Agent, or Firm* — Ingrassia Fisher & Lorenz, LLP | IF&L

(57) ABSTRACT

A vehicle propulsion system including a battery for supplying a direct current (DC), an inverter including a wide band gap transistor for converting the DC to an alternating current (AC) in response to a transistor control signal applied to a gate of the wide band gap transistor, a high voltage power switch coupled in anti-parallel with the wide band gap transistor to provide a path for the current when the wide band gap transistor is turned off, an inverter controller including a power supply for supplying a DC current, a current sensor for detecting a current level of the DC current, and a high voltage transistor for generating the transistor control signal in response to a variation of the current level and the DC current, and an electric motor configured to generate an electromotive torque in response to the AC voltage to propel a vehicle.

20 Claims, 4 Drawing Sheets

(56) References Cited

OTHER PUBLICATIONS

Texas Instruments, (Dec. 2022) UCC5880-Q1 Isolated 20A Adjustable Gate Drive IGBT/SiC MOSFET Gate Driver With Advanced Protection Features for Automotive Applications, Product Datasheet. chrome-extension://efaidnbmnnnibpcajpcglclefindmkaj/https://www.ti.com/lit/ds/symlink/ucc5880-q1.pdf?ts=1758574697190&ref_url=https%253A%252F%252Fwww.google.com%252F. Texas Instruments.

Wikipedia contributors. (Jun. 20, 2025). Gate driver. In Wikipedia, The Free Encyclopedia. Retrieved 21:13, Sep. 22, 2025, from https://en.wikipedia.org/w/index.php?title=Gate_driver&oldid=1296526778.

Wikipedia contributors. (Jul. 18, 2025). Wide-bandgap semiconductor. In Wikipedia, The Free Encyclopedia. Retrieved 21:12, Sep. 22, 2025, from https://en.wikipedia.org/w/index.php?title=Wide-bandgap_semiconductor&oldid=1301258521.

* cited by examiner

FIG. 1

LOW LOSS ACTIVE HIGH VOLTAGE POWER SWITCH

INTRODUCTION

The present disclosure generally relates to electric vehicle motors and battery systems, and more particularly relates to a method and apparatus including a high voltage (HV) power switch using a single or multi-chip parallel combination of semiconductor devices to reduce losses and package size which can be triggered using self-sensing of voltage and/or current or by external current sensor, controller-based prediction, diode temperature or by suitable analog comparators and logic circuits.

Electric motors are used in electric vehicles (EV) to convert electrical energy from the battery into mechanical energy to turn the wheels. Typically, there are two main types of electric motors used in EVs: induction motors and permanent magnet synchronous motors (PMSMs). Induction motors are the most common type of electric motor used in EVs. Induction motors are also very efficient, and they can provide a high torque output. PMSMs are often used in high-performance EVs, such as sports cars and racing cars. Modern EVs typically have two electric motors, one for each axle, but some EVs can have a single motor located under the hood or four motors, one for each wheel.

SUMMARY

Disclosed herein are vehicle control methods and systems and related electrical systems for provisioning vehicle propulsion systems, methods for making and methods for operating such systems, and motor vehicles and other equipment such as aircraft, trucks, buses, forklifts, construction vehicles and other electric vehicles equipped with battery powered electric motors. By way of example, and not limitation, there are presented various embodiments of systems to provide a novel low loss active high voltage switching transistor for use in an electric vehicle inverter.

In accordance with an aspect of the present disclosure, a vehicle propulsion system including a battery for supplying a direct current (DC) voltage, an inverter including a wide band gap transistor for converting the DC voltage to an alternating current (AC) voltage in response to a transistor control signal applied to a gate of the wide band gap transistor, a high voltage power switch coupled in anti-parallel with the wide band gap transistor to provide a path for the current when the wide band gap transistor is turned off, an inverter controller including a power supply for supplying a DC current, a current sensor for detecting a current level of the DC current, and a high voltage transistor for generating the transistor control signal in response to a variation of the current level and the DC current, and an electric motor configured to generate an electromotive torque in response to the AC voltage to propel a vehicle.

In accordance with another aspect of the present disclosure, wherein the current sensor is a dual comparator.

In accordance with another aspect of the present disclosure, wherein the high voltage transistor includes a positive-negative-positive (PNP) transistor and a negative-positive-negative (NPN) transistor configured in parallel.

In accordance with another aspect of the present disclosure, wherein the power supply is an isolated bias power supply.

In accordance with another aspect of the present disclosure, wherein the high voltage transistor is a high voltage diode having a linear increase in a voltage drop proportional to the current level up to a predetermined current level.

In accordance with another aspect of the present disclosure, wherein the high voltage transistor has a greater than linear increase in the voltage drop proportional to the current level above the predetermined current level.

In accordance with another aspect of the present disclosure, wherein the high voltage transistor has a less than linear increase in the voltage drop proportional to the current level above the predetermined current level.

In accordance with another aspect of the present disclosure, wherein the high voltage transistor includes an internal control logic configured to automatically switch it to a low on-resistance state in response to a cathode turning negative with respect to an anode and to return to a blocking state in response to a current thought the high voltage transistor being reversed.

In accordance with another aspect of the present disclosure, wherein the high voltage transistor is synchronously triggered between an on state and an off state in response to at least one of an internal current sense signal polarity, an external current sensor, and a trigger circuit.

In accordance with another aspect of the present disclosure, a method of propelling a vehicle including generating a DC current using an isolated bias power supply, detecting a current level, using a current sensor, of the DC current, generating a transistor control signal in response to the DC current and the current level exceeding a threshold, generating an AC voltage using a wide band gap transistor in response to the transistor control signal and a DC voltage from a battery, generating a short circuit across the wide band gap transistor using a high voltage power switch coupled in anti-parallel with the wide band gap transistor to provide a path for the current when the wide band gap transistor is turned off in response to the DC current and the current level not exceeding the threshold, and propelling the vehicle using an electromotive force generated by an electric motor in response to the AC voltage.

In accordance with another aspect of the present disclosure, wherein the wide band gap transistor includes a multichip module on an insulated substrate with a cooling plate.

In accordance with another aspect of the present disclosure, wherein the current sensor, the wide band gap transistor and the high voltage diode are integrated within a single semiconductor device.

In accordance with another aspect of the present disclosure, wherein the wide band gap transistor is formed from one of silicon, silicon carbide, aluminum nitride, diamond, gallium nitride, gallium nitride on silicon, gallium nitride on gallium nitride, and gallium oxide.

In accordance with another aspect of the present disclosure, wherein the high voltage diode has a low on-resistance.

In accordance with another aspect of the present disclosure, wherein the high voltage diode includes a plurality of silicon medium power transistors configured in parallel.

In accordance with another aspect of the present disclosure, wherein the current sensor is a dual comparator.

In accordance with another aspect of the present disclosure, wherein the current sensor includes a controller based prediction.

In accordance with another aspect of the present disclosure, wherein the current sensor includes a diode temperature sensor.

In accordance with another aspect of the present disclosure, an inverter control system for use in an electric vehicle including an inverter including a wide band gap transistor for converting a DC voltage from a battery to an AC voltage in response to a transistor control signal applied to a gate of the wide band gap transistor, and a high voltage power switch coupled in anti-parallel with the wide band gap transistor to provide a path for the current when the wide band gap transistor is turned off, and wherein an electric motor is configured to generate an electromotive torque in response to the AC voltage to propel the electric vehicle, a power supply for supplying a DC current, a current sensor for detecting a current level of the DC current, and a high voltage diode for generating the transistor control signal in response to a variation of the current level and the DC current.

In accordance with another aspect of the present disclosure, wherein the high voltage diode includes a PNP transistor and a NPN transistor configured in parallel and wherein the current sensor is a dual comparator.

BRIEF DESCRIPTION OF THE DRAWINGS

The exemplary embodiments will hereinafter be described in conjunction with the following drawing figures, wherein like numerals denote like elements, and wherein:

FIG. 1 is illustrative of a vehicle employing one or more electric vehicle motors and battery systems in accordance with various embodiments;

DETAILED DESCRIPTION

Figure 2A:
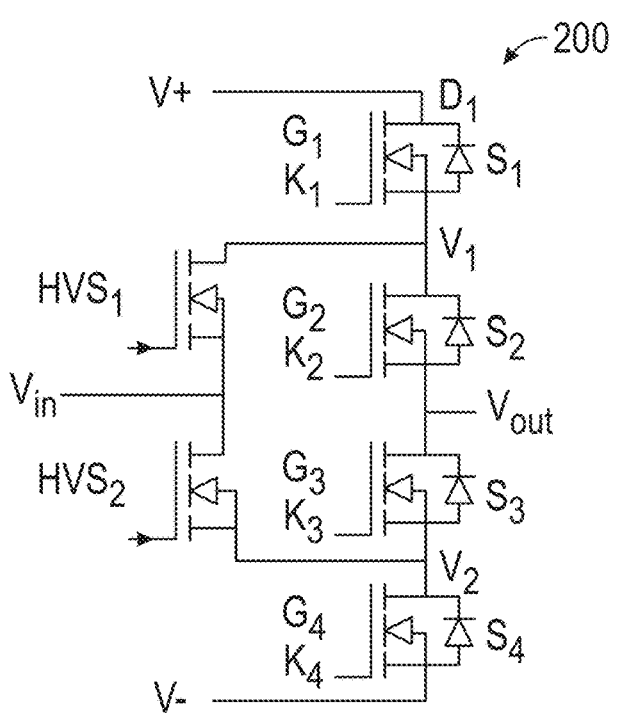
FIG. 2a shows a schematic representation of a stage of a neutral clamped three level inverter including the application of a plurality of high voltage (HV) power switches in accordance with various embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
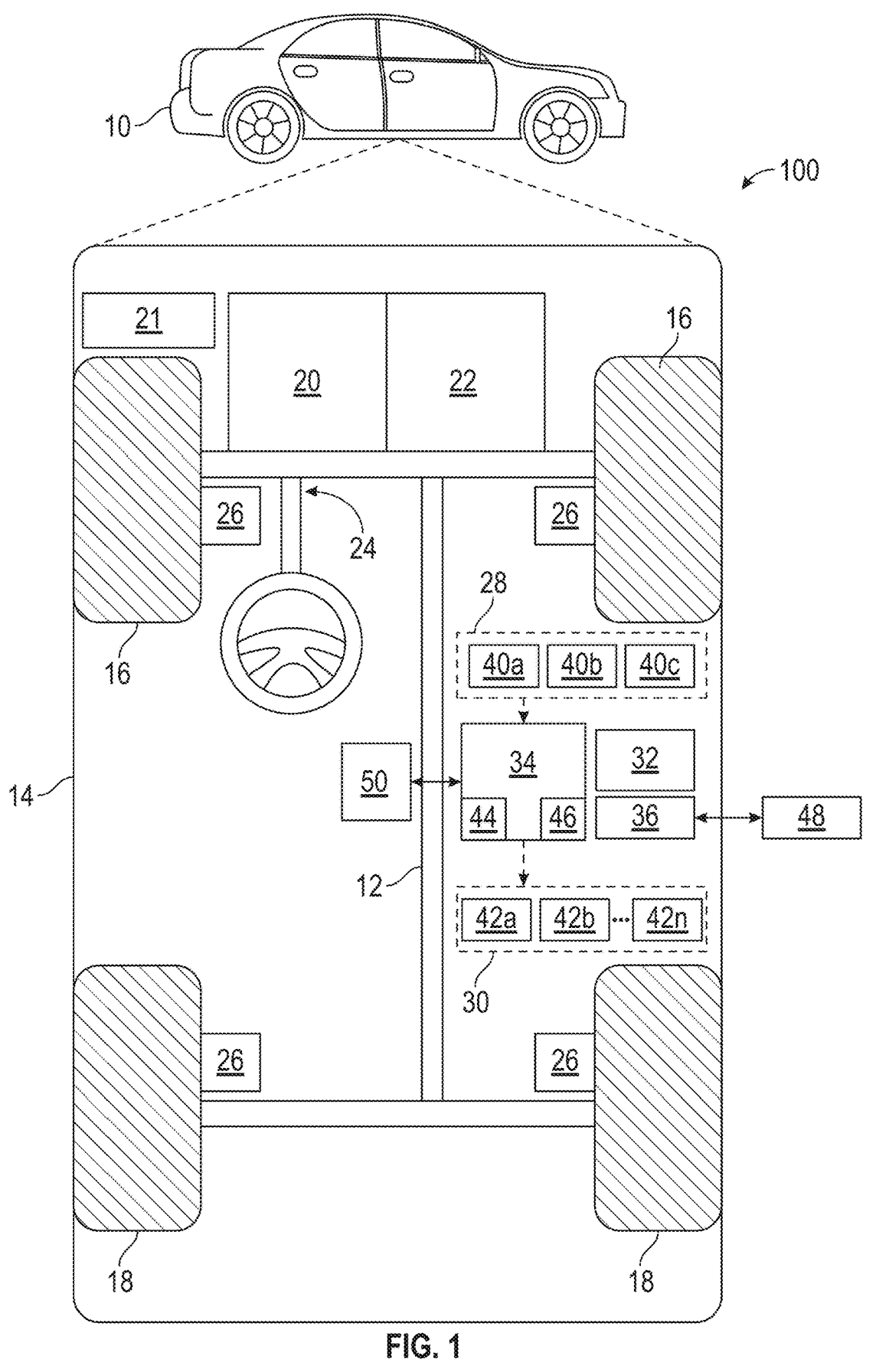

With reference to FIG. 1, a vehicle 10 is shown employing one or more electric vehicle motors and battery systems, and more particularly employs a dynamically adjustable traction inverter to utilize adjustable dead time to minimize the conduction losses while simultaneously preventing any shoot-through in the inverter phase legs by utilizing power devices with minimum switching times and gate charge to enable shorter dead times As shown in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In various embodiments, the vehicle 10 can be an autonomous vehicle that is automatically controlled to carry passengers and/or cargo from one location to another. In an exemplary embodiment, the vehicle 10 can have an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating a virtual view having harmonized color in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, a fuel cell propulsion system, and/or a combination thereof. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, a manual transmission, or any other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems (GPS), optical cameras, thermal cameras, ultrasonic sensors, and/or other sensors. The sensing devices 40a-40n are further configures to sense observable conditions of the vehicle 10. The sensing devices 40a-40n can include, but are not limited to, speed sensors, position sensors, inertial measurement sensors, temperature sensors, pressure sensors, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2B:
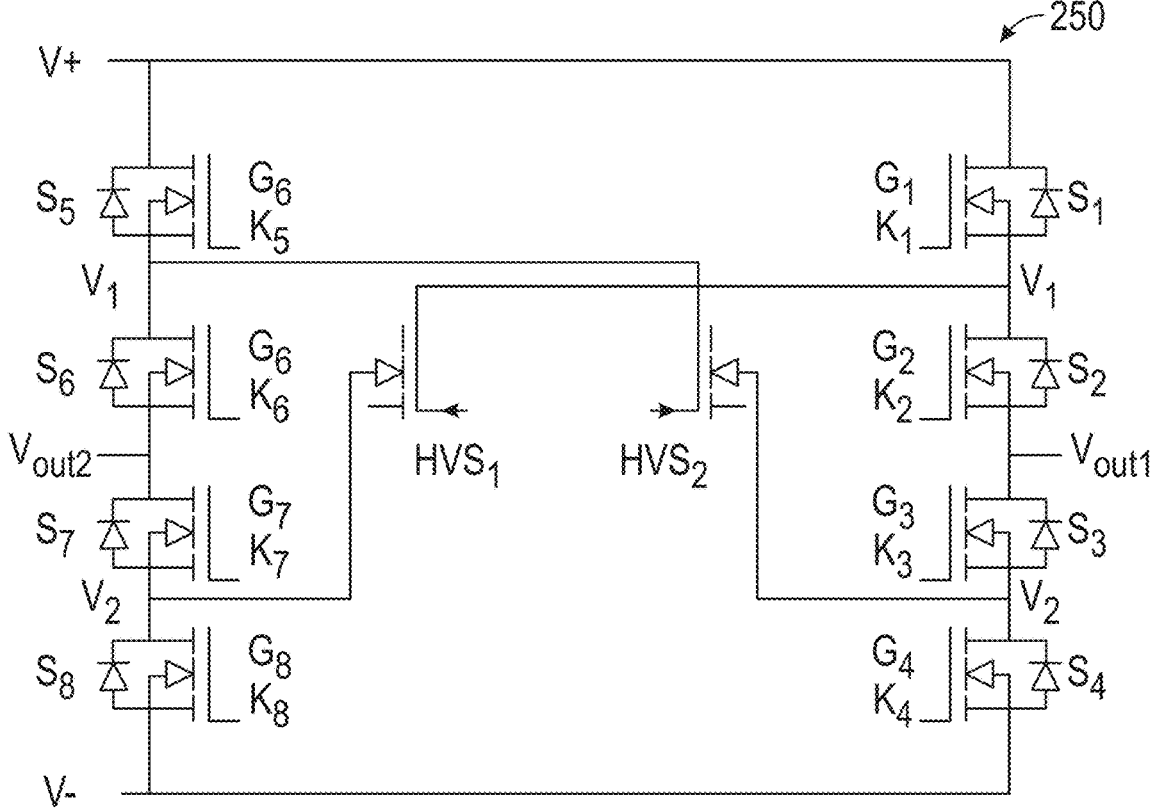
FIG. 2b shows a schematic representation of a stage of an X type three level inverter including the application of a plurality of HV power switches in accordance with various embodiments.

The communication system 36 is configured to wirelessly communicate information to and from other entities 48, such as but not limited to, other vehicles (vehicle to vehicle (V2V) communication,) infrastructure (vehicle to infrastructure (V2I) communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the surround view display system 100 and, when executed by the processor 44, process image data from at least one optical camera of the sensor system 28 to extract features from the images in order to determine the ground plane. The instructions, when executed by the processor 44, use the ground plane to determine camera alignment information. The camera alignment information is then used to assemble the image data to form a surround view from a defined perspective. In various embodiments, the sensing devices 40a to 40n include N (one or more) cameras that sense an external environment of the vehicle 10 and generate the image data (e.g., optical cameras that are configured to capture color pictures of the environment). The cameras are disposed so that they each cover a certain field of view of the vehicle's surroundings. The image data from each camera is assembled into a surround view based on, for example, the pose and the location of the camera relative to the vehicle and relative to the ground.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Turning now to FIG. 2*a*, a schematic representation of a stage of a neutral clamped three level inverter 200 including the application of a plurality of high voltage (HV) power switches is shown. A neutral-clamped three-level inverter 200 is a type of power electronic converter that produces a three-level output voltage. The core concept behind this inverter is the use of a neutral point clamped (NPC) configuration with the middle point of the direct current (DC) bus connected to the neutral point through high voltage power switches $HVS_1$, $HVS_2$. The neutral clamped inverter 200 can further include a positive DC bus voltage V+, a negative DC bus voltage V−, a neutral point of the DC bus Vn, a DC voltage source 1 V1, a DC voltage source 2 V2, an output voltage Vout, power switches (typically insulated-gate bipolar transistors (IGBTs) or metal-oxide-semiconductor field-effect transistors (MOSFETs) S1, S2, S3, S4, a clamping diode D1, gate signals for the respective switches G1, G2, G3, G4, control signals for the respective switches K1, K2, K3, K4, and high voltage switches $HVS_1$, $HVS_2$.

The NPC configuration employs a combination of HV power switches and capacitors to clamp the voltage at the middle point of the DC bus. Typically, NPC inverter employ diodes connecting the DC bus to the neutral point. However, HV, standard or high speed (especially 1200V rated) silicon (Si) and wide band gap (WBG) diodes have excessive voltage drop at rated current and high temperatures. The fixed junction voltage drop of about 1V of a diode results in significant part load losses affecting drive cycle efficiency. Using HV power switches $HVS_1$, $HVS_2$, it enables the inverter 200 to produce a zero-voltage output, which significantly reduces harmonic distortion in the output waveform. This improved power quality makes neutral-clamped three-level inverters suitable for various applications, such as motor drives, renewable energy systems, and traction drives. Additionally, the three-level output voltage allows for higher voltage ratings and reduced switching losses compared to two-level inverters, resulting in increased efficiency and system performance.

HV power switches $HVS_1$, $HVS_2$ in a neutral-clamped three-level inverter serve a critical function in ensuring efficient and reliable operation. Primarily, they facilitate the clamping of the DC bus voltage at the neutral point, allowing for the generation of a zero-voltage level in the output waveform. This clamping action significantly reduces harmonic distortion, improving the power quality of the inverter's output. Additionally, HV power switches $HVS_1$, $HVS_2$ provide a zero impedance path for the inductive load current during switch commutation, preventing excessive voltage spikes across the switching devices and mitigating potential damage. By effectively managing current flow and voltage levels, the HV power switches $HVS_1$, $HVS_2$ contribute to the overall performance and durability of the neutral-clamped three-level inverter.

Advantageously, use of HV self-controlled high voltage power switches $HVS_1$, $HVS_2$ having low on-resistance in conjunction with a sensing and control circuit to turn the HV power switches $HVS_1$, $HVS_2$ into a conduction state or non-conduction state. The low on-resistance HV power switches $HVS_1$, $HVS_2$ can be integrated along with a reduced size HV diode to achieve desirable part load low voltage drop while maintaining the high surge current capability of a diode. Multiple diode, low on-resistance switches may be integrated into a single package having a common sensing and control circuit to provide higher current capability. In some exemplary embodiments, the high voltage power switches $HVS_1$, $HVS_2$ are connected in anti-parallel with the power switches S1, S2, S3, S4 to provide a path for the current when the switch is turned off. The high voltage power switches $HVS_1$, $HVS_2$ can be used in the neutral clamping circuit to ensure that the voltage across the switches doesn't exceed the DC supply voltage. In an electric circuit, anti-parallel refers to two components connected in parallel but with their polarities reversed. This means that the positive terminal of one component is connected to the negative terminal of the other, and vice versa.

Turning now to FIG. 2 *b*, a schematic representation of a stage of an X type three level inverter 250 including the application of a plurality of HV power switches HVS is shown. An X-type three-level inverter 250 is a power electronic converter that employs a specific switching topology to generate a multilevel output voltage waveform from multiple DC voltage sources. X-type inverters are well-suited for high-power applications such as motor drives and renewable energy systems. The X type neutral clamped inverter 250 can further include a positive DC bus voltage V+, a negative DC bus voltage V−, a neutral point of the DC bus Vn, a DC voltage source 1 V1, a DC voltage source 2 V2, an output voltage Vout, power switches (typically IGBTs or MOSFETs) S1, S2, S3, S4, a clamping diode D1, gate signals for the respective switches G1, G2, G3, G4, control signals for the respective switches K1, K2, K3, K4, and high voltage switches $HVS_1$, $HVS_2$.

In an X-type three-level inverter 250, HV power switches $HVS_1$, $HVS_2$ can be employed for clamping the voltage across the DC bus capacitors to half the DC bus voltage. This voltage clamping ensures that the voltage across each switching device never exceeds half the DC bus voltage, regardless of the switching state. Additionally, diodes act as freewheeling paths for the inductor currents during certain switching states, preventing excessive voltage spikes across the switching devices. By effectively clamping voltages and providing freewheeling paths, the HV power switches $HVS_1$, $HVS_2$ contribute to the efficient and reliable operation of the X-type three-level inverter.

Figures 3, 4:
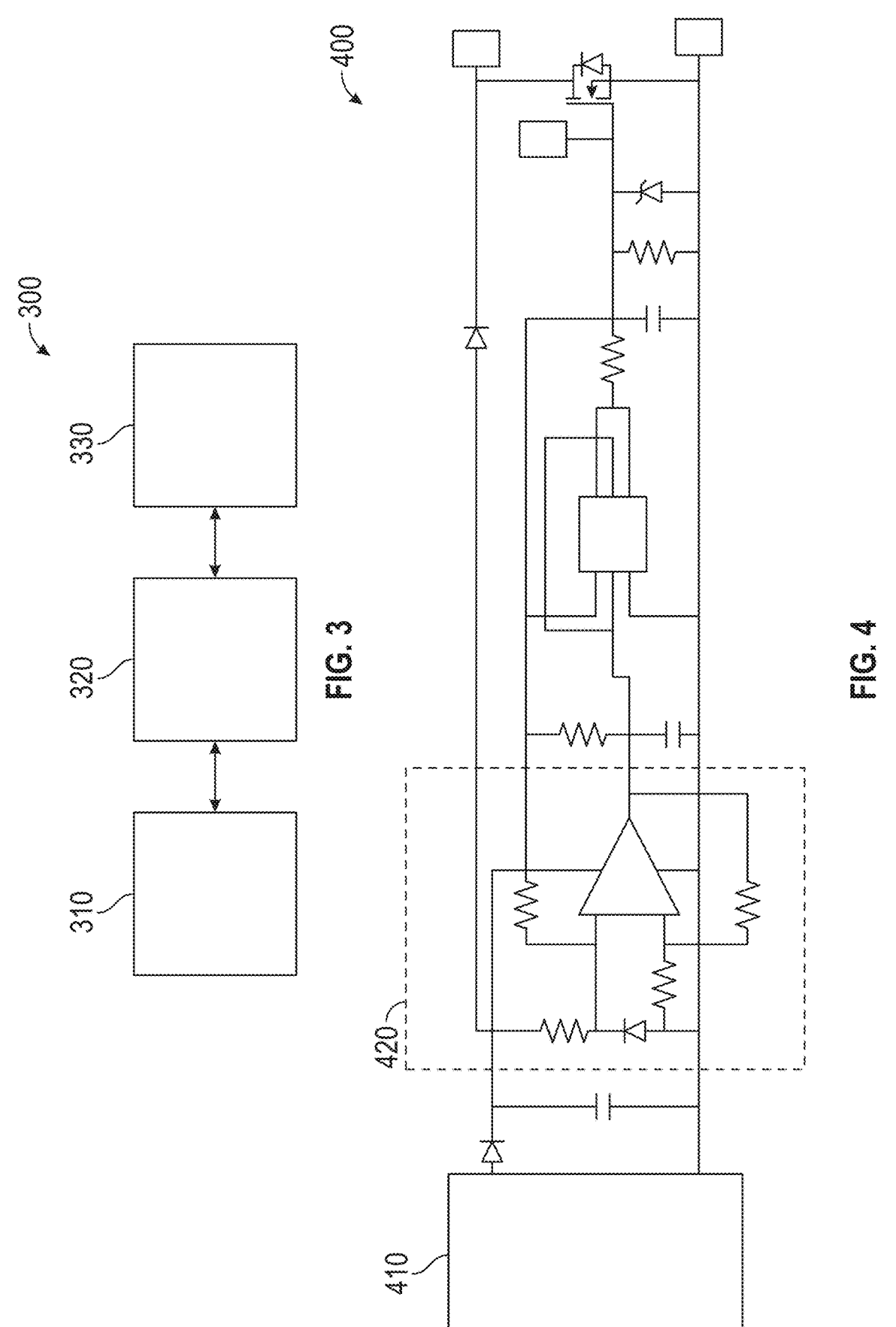
FIG. 3 shows a graphical representation of an exemplary circuit diagram an electronics package for providing a low loss active high voltage diode functionality in accordance with various embodiments.
FIG. 4 shows a graphical representation of an electronics package for providing a low loss active high voltage diode functionality in accordance with various embodiments.

Turning now to FIG. 3, a block diagram of an exemplary electronics package 300 for providing a low loss active high voltage diode functionality according to an exemplary embodiment is shown. The exemplary electronics package 300 includes an isolated bias power supply 310, a dual comparator 320, a high voltage transistor 330 and a wide bandgap (WBG) transistor 340.

In some exemplary embodiments, the electronics package 300 can be configured as a self-controlled high voltage power switch having low on-resistance in conjunction with a sensing and control circuit to turn the HV switch into a conduction state or non-conduction state. The low on-resistance switch may be integrated along with a reduced size HV diode to achieve desirable part load low voltage drop while maintaining the high surge current capability of a diode. In addition, multiple diode, low on-resistance switches may be integrated into a single package having a common sensing and control circuit to provide higher current capability. The exemplary electronics package 300 is operative to provide to high-voltage diode functionality by employing a single or multi-chip parallel combination of WBG or ultra-wide bandgap (UWBG) metal-oxide-semiconductor field-effect transistors (MOSFETs), Gallium nitride (GaN) field effect transistors (FETs), High-electron-mobility transistor (HEMT) or vertical, or similar majority carrier devices. This enables the high voltage diode circuit to substantially reduce power losses and minimize package size. The electronics package 300 can be activated through various methods, including self-sensing of voltage and/or current, external current sensing, controller-based prediction, diode temperature monitoring, or the utilization of suitable analog comparators and logic circuits.

The isolated bias power supply 320 can be configured to supply a DC voltage to a circuit while maintaining complete electrical isolation between the input and output circuits. In some exemplary embodiments, this isolation is achieved through the use of a transformer, which acts as a galvanic isolator, preventing the flow of current between the input and output sides. The isolated bias power supply 320 enhances safety by providing galvanic isolation, reduces spurious noise by minimizing ground loops, and improves overall system performance by ensuring stable and reliable power delivery to sensitive circuits. This isolation is particularly crucial in high-voltage or sensitive environments, such as medical equipment, industrial control systems, and audio amplifiers.

In some exemplary embodiments, a dual comparator 320 is employed between the isolated bias power supply 320 and the high voltage transistor 330 and wide bandgap transistor 340 to function as a sensing and control circuit. The dual comparator 320 can be used to trigger the active device using a self-sensing voltage and/or current. Alternatively, external current sensors, controller-based prediction, diode temperature or other suitable analog comparators and logic circuits can be used to trigger the active device in response to voltage level and/or current level.

The high voltage transistor 330 can be a high-voltage MOSFET transistor or the like, specifically designed to handle elevated voltage levels, typically ranging from several hundred to several thousand volts. This high voltage transistor 330 For switching high-voltage DC currents in devices like inverters, converters, and motor drives. In addition to the high-voltage rating, the high voltage transistor 330 can include a low on-resistance, making it an ideal choice for high-power applications. A low on-resistance directly influences the high voltage transistor's 330 efficiency, power dissipation, and switching speed. A lower on-resistance reduces the voltage drop across the transistor, leading to lower power losses and higher overall efficiency. Low on-resistance helps to prevent excessive heat generation, which can prolong the transistor's lifespan and improve system reliability by minimizing power losses. In addition, a lower on-resistance enables faster switching times, allowing the high voltage transistor 330 to respond more quickly to changes in input signals.

In some exemplary embodiments, the high voltage transistor Q4 can be a WGB transistor. The WGB transistor can operate at significantly higher switching frequencies, enabling smaller, lighter, and more efficient electric vehicle (EV) inverters. WGB transistor have lower on-state resistance and faster switching speeds minimize power losses, leading to improved efficiency and extended battery life. In addition, WBG transistors can withstand higher voltages, allowing for more efficient motors and simplified power conversion stages and their ability to operate at higher temperatures enhances reliability and reduces the need for complex thermal management systems.

Turning now to FIG. 4, an exemplary circuit diagram of an electronics package 400 for providing a low loss active high voltage diode functionality according to an exemplary embodiment is shown. The exemplary electronics package 400 includes an isolated bias power supply 410, a dual comparator 420, and a high voltage transistor Q4. The dual comparator is configured to compare two input voltages, such as V1 and V2, and to output a high state in the case of V1 being greater than V2 and a low state in the case of V1 being less than V2. Because of these precise voltage thresholds, the dual comparator 420 can be configured to trigger the high voltage transistor Q4 at very a precise voltage threshold. This allows for accurate control over when the transistor turns on or off. In some exemplary embodiment, the dual comparator 420 can be configured with an operational amplifier Q3 in a non-inverting configuration. In this configuration, the gain is equal to 1+(R22/R21). In some exemplary embodiments the gain can be 2001 or 1+20MΩ/10 kΩ. In some exemplary embodiments, the exemplary electronics package 400 can be a control integrated circuit (IC) and/or ASIC integrated within a device package.

In some exemplary embodiments, the high voltage transistor Q4 can be configured for triggering the WBG transistor to overcome the WBG transistor high gate threshold voltage. Directly triggering a wide-gap transistor with a conventional voltage source can be challenging due to its high breakdown threshold, potentially requiring an excessively high voltage, which may be impractical. The high voltage transistor Q4 can efficiently drive the gate capacitance of WBG transistors, minimizing switching losses and enhancing overall system efficiency. In addition, the fast switching capabilities of the high-voltage transistor Q4 complements the rapid switching characteristics of WBG transistor, enabling more efficient power conversion. This synergy is particularly advantageous in applications such as EVs, where high power densities and low energy losses are critical.

In some exemplary embodiments, the operational amplifier Q3 can be formed by a PNP transistor and an NPN transistor configured in parallel such that the collectors are electrically coupled, the emitters are electrically coupled and the bases are electrically coupled. The parallel configuration of a PNP and an NPN transistor can offer several advantages, including enhanced current capacity: The combined current-handling capabilities of both transistor types can increase the overall current rating of the circuit. In addition, the complementary characteristics of PNP and NPN transistors can lead to faster switching times and a more balanced performance. The parallel arrangement can provide a degree of fault tolerance, as the failure of one transistor may not completely disrupt the circuit's operation. In some exemplary embodiments, the transistors can be silicon transistors. For example, a parallel combination of Silicon Carbide, silicon, GaN or Gallium arsenide diodes and majority carrier devices can be employed to achieve high surge current capability.

In some exemplary embodiments, the electronics package 400 can be configured as a multichip module on insulated substrate with cooling plate and can be integrated and fabricated in the same semiconductor chip. The electronics packager 400 can have discrete circuit or ASIC IC to control the change in voltage as a function of the change in time (dV/dt) or the change in current as a function of the change in time (dI/dt) to optimize, loss, overshoots, and electromagnetic interference. The HV transistor can be used in the EV inverter for converting the DC battery current to an AC current for use to drive the electric motor. The high voltage transistor Q4 is ideal for EV inverters due to their superior performance characteristics, such as high switching frequency, lower on-stage resistance, higher blocking voltage, and higher temperature tolerance. The high voltage transistor Q4 can operate at much higher frequencies than traditional silicon transistors enabling the inverters to achieve higher switching efficiency and reduce losses. The high voltage transistor Q4 faster switching time reduces switching losses and allows for more precise control of the inverter's output. The high voltage transistor Q4 has a lower on-state resistance, which means less power is wasted as heat when the transistor is conducting. This leads to improved efficiency and reduced cooling requirements. The high voltage transistor Q4 can withstand higher voltage levels without breaking down, allowing for smaller and lighter inverters. The high voltage transistor Q4 can operate at higher temperatures without degrading performance, which is important for electric vehicle (EV) applications where the inverter can be exposed to high temperatures.

Figure 5:
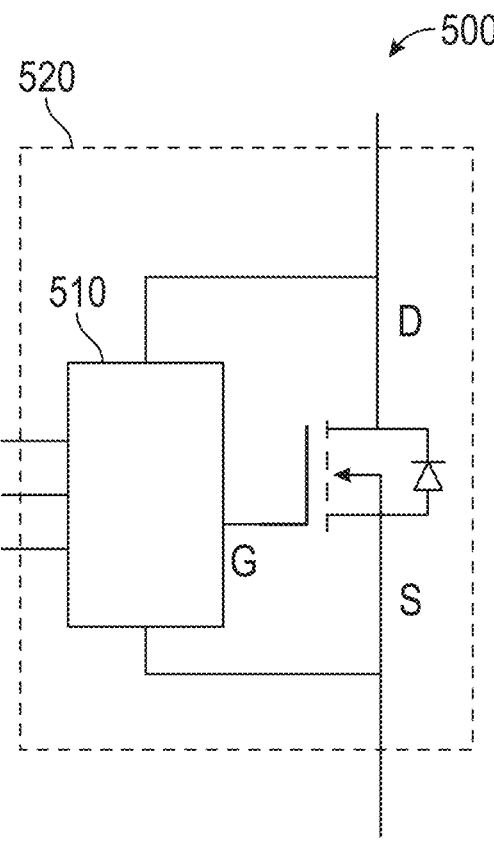
FIG. 5 shows a block diagram of an exemplary power supply and control circuit for driving the wide band gap inverter transistor in accordance with various embodiments.

Turning now to FIG. 5, a block diagram of an exemplary power supply and control circuit 500 for driving the high voltage transistor 520 is shown. The controller 510 is configured to controlling the circuit's behavior. "Bias" can refer to setting the operating point of the circuit, "Sens" can refer sensing or measuring parameters, and "Control" can be used for overall circuit control. The power input can include input power to the circuit, such as from a battery and the return terminal being a common return point on the power supply system. In addition, the on/off terminal can be used to control the power supply's on/off state. The transistor can be synchronously triggered between on and off states based on internal current sense signal polarity or using an external current sensor and trigger circuit.

In some exemplary embodiments, the controller 510 can be configured for controlling the low loss active high voltage diode functionality including bias, sensing and control. Bias can include setting the operating point of the circuit, sensing can include sensing or measuring parameters, and control can be used for overall circuit control. Internal control logic can be used to automatically switch it to low on-resistance state when the cathode turns negative with respect to the anode and return the device to blocking state when the current through the device reversed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle propulsion system comprising:
a battery for supplying a direct current (DC) voltage;
an inverter including a wide band gap transistor for converting the DC voltage to an alternating current (AC) voltage in response to a transistor control signal applied to a gate of the wide band gap transistor;
a high voltage power switch coupled in anti-parallel with the wide band gap transistor to provide a path for current when the wide band gap transistor is turned off;
an inverter controller including a power supply for supplying a DC current, a current sensor for detecting a current level of the DC current, and a high voltage transistor for generating the transistor control signal in response to a variation of the current level and the DC current; and
an electric motor configured to generate an electromotive torque in response to the AC voltage to propel a vehicle.

2. The vehicle propulsion system of claim 1, wherein the current sensor is a dual comparator.

3. The vehicle propulsion system of claim 1, wherein the high voltage transistor is a metal-oxide-semiconductor field-effect transistor.

4. The vehicle propulsion system of claim 1, wherein the power supply is an isolated bias power supply.

5. The vehicle propulsion system of claim 1, wherein the high voltage transistor is a high voltage diode having a linear increase in a voltage drop proportional to the current level up to a predetermined current level.

6. The vehicle propulsion system of claim 5, wherein the high voltage transistor has a greater than linear increase in the voltage drop proportional to the current level above the predetermined current level.

7. The vehicle propulsion system of claim 5, wherein the high voltage transistor has a less than linear increase in the voltage drop proportional to the current level above the predetermined current level.

8. The vehicle propulsion system of claim 1, wherein the high voltage transistor includes an internal control logic configured to automatically switch it to a low on-resistance state in response to a cathode turning negative with respect to an anode and to return to a blocking state in response to a current through the high voltage transistor being reversed.

9. The vehicle propulsion system of claim 1, wherein the high voltage transistor is synchronously triggered between an on state and an off state in response to at least one of an internal current sense signal polarity, an external current sensor, and a trigger circuit.

10. A method of propelling a vehicle comprising, generating a DC current using an isolated bias power supply;
detecting a current level, using a current sensor, of the direct current (DC) current;

generating a transistor control signal in response to the DC current and the current level exceeding a threshold;

generating an alternating current (AC) voltage using a wide band gap transistor in response to the transistor control signal and a DC voltage from a battery;

generating a short circuit across the wide band gap transistor using a high voltage power switch coupled in anti-parallel with the wide band gap transistor to provide a path for current when the wide band gap transistor is turned off in response to the DC current and the current level not exceeding the threshold; and propelling the vehicle using an electromotive force generated by an electric motor in response to the AC voltage.

11. The method of propelling the vehicle of claim 10, wherein the wide band gap transistor includes a multichip module on an insulated substrate with a cooling plate.

12. The method of propelling the vehicle of claim 10, wherein the current sensor, the wide band gap transistor and a high voltage diode are integrated within a single semiconductor device.

13. The method of propelling the vehicle of claim 10, wherein the wide band gap transistor is formed from one of silicon, silicon carbide, aluminum nitride, diamond, gallium nitride, gallium nitride on silicon, gallium nitride on gallium nitride, and gallium oxide.

14. The method of propelling the vehicle of claim 10, wherein a high voltage diode has a low on-resistance.

15. The method of propelling the vehicle of claim 10, wherein a high voltage diode includes a plurality of silicon medium power transistors configured in parallel.

16. The method of propelling the vehicle of claim 10, wherein the current sensor is a dual comparator.

17. The method of propelling the vehicle of claim 10, wherein the current sensor includes a controller based prediction.

18. The method of propelling the vehicle of claim 10, wherein the current sensor includes a diode temperature sensor.

19. An inverter control system for use in an electric vehicle comprising:

an inverter including a wide band gap transistor for converting a direct current (DC) voltage from a battery to an alternating current (AC) voltage in response to a transistor control signal applied to a gate of the wide band gap transistor, and a high voltage power switch coupled in anti-parallel with the wide band gap transistor to provide a path for current when the wide band gap transistor is turned off, and wherein an electric motor is configured to generate an electromotive torque in response to the AC voltage to propel the electric vehicle;

a power supply for supplying a DC current;

a current sensor for detecting a current level of the DC current; and an inverter controller for generating the transistor control signal in response to a variation of the current level and the DC current.

20. The inverter control system for use in the electric vehicle of claim 19, wherein the current sensor is a dual comparator.

* * * * *